(12) United States Patent
Schuknecht et al.

(10) Patent No.: US 12,328,095 B2
(45) Date of Patent: Jun. 10, 2025

(54) ALIGNMENT BRACKET

(71) Applicant: ARRAY TECH, INC., Albuquerque, NM (US)

(72) Inventors: Nathan Schuknecht, Golden, CO (US); Kevin Krautbauer, Phoenix, AZ (US)

(73) Assignee: ARRAY TECH, INC., Alburquerque, NM (US)

( * ) Notice: Subject to any disclaimer, the term of this patent is extended or adjusted under 35 U.S.C. 154(b) by 0 days.

(21) Appl. No.: 18/624,908

(22) Filed: Apr. 2, 2024

(65) Prior Publication Data

US 2024/0348197 A1    Oct. 17, 2024

Related U.S. Application Data

(60) Provisional application No. 63/495,433, filed on Apr. 11, 2023.

(51) Int. Cl.
*H02S 20/30*    (2014.01)
*H02S 20/32*    (2014.01)

(52) U.S. Cl.
CPC .................................. *H02S 20/32* (2014.12)

(58) Field of Classification Search
CPC ....................................................... H02S 20/32
See application file for complete search history.

(56) References Cited

U.S. PATENT DOCUMENTS

| | | | |
|---|---|---|---|
| 2,321,221 A | 6/1943 | Linehan | |
| 5,092,097 A | 3/1992 | Young | |
| 5,249,404 A | 10/1993 | Leek | |
| 5,467,570 A | 11/1995 | Leek | |
| 6,719,481 B2 | 4/2004 | Hoffman | |
| 8,225,575 B2 | 7/2012 | Gadd | |
| 8,925,880 B2 | 1/2015 | Valembois | |
| 10,720,877 B2 | 7/2020 | Haas et al. | |
| 2018/0266729 A1 | 9/2018 | Dai | |
| 2021/0175842 A1* | 6/2021 | Jacobs | E04B 1/2403 |
| 2021/0367550 A1* | 11/2021 | Wang | H01L 31/0684 |
| 2022/0077816 A1 | 3/2022 | Morin | |
| 2022/0329200 A1 | 10/2022 | Duan | |
| 2022/0407451 A1 | 12/2022 | Jacobs | |
| 2024/0204715 A1 | 6/2024 | Schuknecht | |

FOREIGN PATENT DOCUMENTS

JP     2013064319 A     4/2013

OTHER PUBLICATIONS

European Patent Office; International Search Report and Written Opinion issued in Int'l App No. PCT/US24/022655 dated Jul. 18, 2024.

* cited by examiner

*Primary Examiner* — Jayne L Mershon
(74) *Attorney, Agent, or Firm* — MASCHOFF BRENNAN (57) ABSTRACT

An alignment bracket suitable for facilitating the connection of solar components in a PV system may include a first surface, a second surface, and an attachment member. The first surface may be configured to physically interface with a corresponding surface of a solar component of the PV system. The second surface may be configured to physically interface with a corresponding surface of a support column. The attachment member may include an engagement surface configured to engage with a part of the support column to facilitate a position of the second surface relative to the corresponding surface of the support column.

20 Claims, 12 Drawing Sheets

ALIGNMENT BRACKET

CROSS-REFERENCE TO RELATED APPLICATION

This patent application claims the benefit of and priority to U.S. Provisional App. No. 63/495,433 filed Apr. 11, 2023, titled "ALIGNMENT BRACKET," which is incorporated in the present disclosure by reference in its entirety.

FIELD

The embodiments discussed in the present disclosure are related to solar tracking systems and, more particularly, to an alignment bracket for use in a solar tracking system.

BACKGROUND

Construction of large solar installations can be labor intensive and time consuming. In a typical large-scale installation, there can be multiple connection points for connecting solar panels to support columns, either directly or via a torque tube in a solar tracking system. For example, in a system utilizing a solar tracking system, installation of a typical torque tube interface may require that an installer properly align a mounting bracket and the torque tube interface with a given support column in a specific position, and then installing one or more fasteners to first couple the mounting bracket to the support column, and then the torque tube interface to the mounting bracket. All the while, the installer must physically maintain proper alignment of the parts. The process is often difficult and time consuming and can be particularly difficult for a single installer. Dropping the fasteners, the mounting bracket, or other mounting hardware, or maintaining proper alignment of the components during installation, are common problems, all of which add to the complexity of installing solar tracking systems.

One solution is to use multiple installers working together to physically align and couple the mounting bracket and the torque tube interface to the support columns. For example, a first installer may align and hold the mounting bracket relative to the support column and a second installer may install the one or more fasteners to secure the connection. As another example, a first installer may align and hold the torque tube interface relative to the support column and/or the mounting bracket and a second installer may install the one or more fasteners to secure the connection. However, increasing the number of installers is not ideal, both in terms of cost and efficiency.

In addition, in a typical large-scale installation, a distribution process may include multiple mounting brackets being distributed throughout the solar installation by placing individual mounting brackets on the ground proximate corresponding support columns then the installers may pick the mounting brackets up from the ground prior to coupling them to corresponding support columns. This distribution process may be physically taxing for installers and can add time to the installation process. Accordingly, there is a need for an improved system for installing the solar components to support columns.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address some of the problems associated with efficiently attaching the mounting bracket, the torque tube interface, and/or other solar components to a support column. In particular, disclosed embodiments provide an alignment bracket that includes attachment members that can be used to facilitate the connection to a support column or similar structure. In disclosed embodiments, the attachment member includes an engagement surface configured to engage with a part of a support column in a manner that maintains the position and/or the alignment of the alignment bracket relative to the support column. In this way, the alignment bracket maintains a positioned state and/or an aligned state relative to the support column without an installer (or an assistant) needing to hold the alignment bracket in place while installing the fasteners. Additionally or alternatively, the attachment member permits multiple alignment brackets to be distributed throughout the solar installation by hanging the alignment brackets from corresponding support columns rather than placing the alignment brackets on the ground. This simplifies the installation process and may reduce the number of installers needed. In addition, this reduces the steps to install the alignment brackets by removing the step of picking them up from the ground prior to coupling them to corresponding support columns. The alignment bracket thereby increases installation efficiency, reduces manpower requirements, and thereby reduces costs associated with the installation process.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
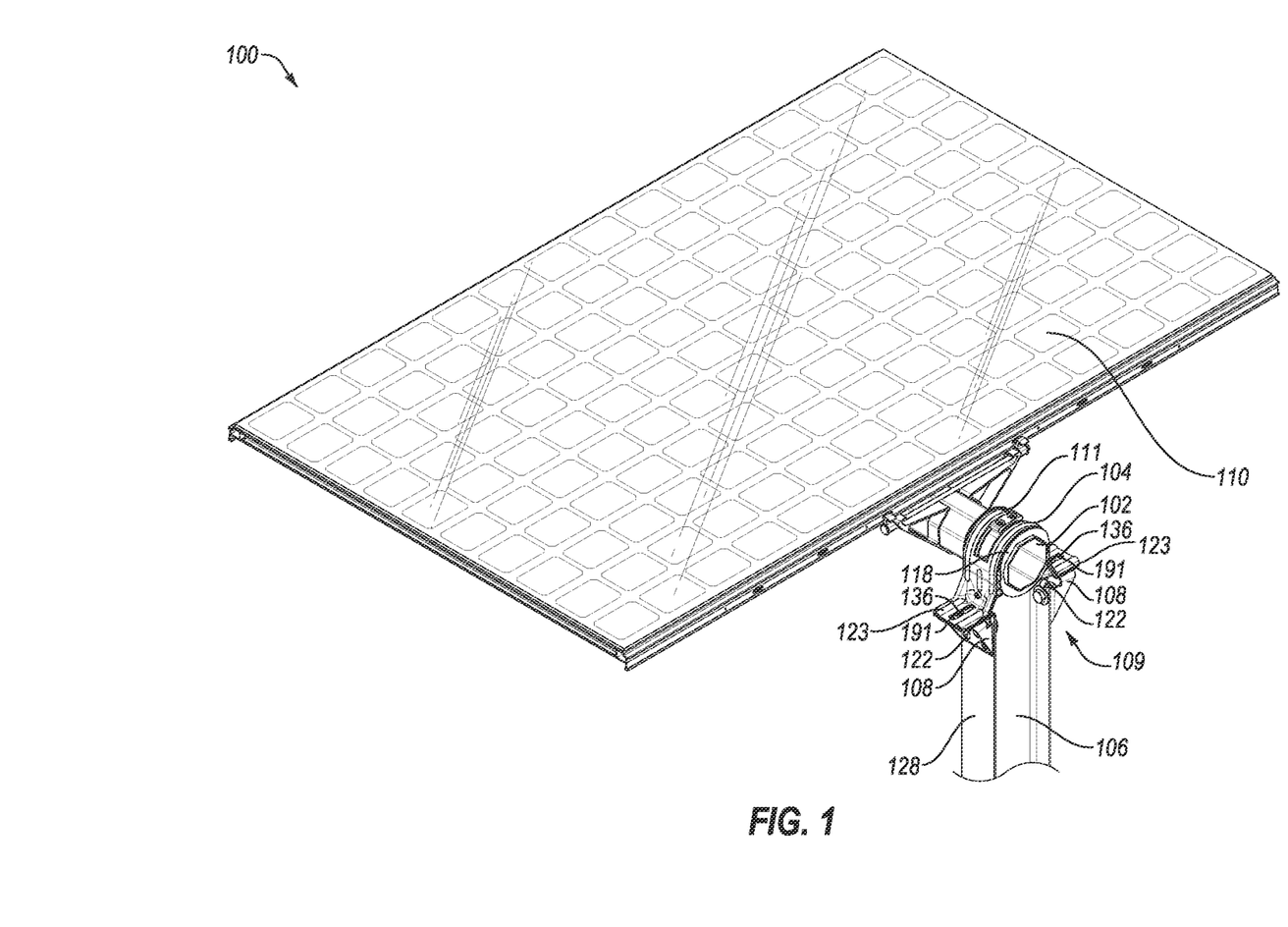
FIG. 1 illustrates a block diagram of an example solar tracking system that includes one example embodiment of a torque tube interface and an alignment bracket configuration.

Referring to FIG. 1, an example of one type of system environment in which aspects of the present disclosure might be used is shown. Shown here is an embodiment of a solar tracking system 100, which includes a solar component, which is connected to a support column 106. In the example shown, the solar component includes a torque tube interface, generally denoted at 109, that operatively connects a torque tube 102 to a support column 106 via two alignment brackets 108. While embodiments of the alignment brackets 108 are described with respect to attachment of the torque tube interface 109, it will be appreciated that variations of the alignment brackets 108 can be used to facilitate the attachment of other solar components to support columns. For example, the alignment brackets 108 may facilitate the attachment of a drive system, a rotation lock, a damper device, a sensor, an electronic device, a structural arm, a structural bearing, a structural bushing, or some combination thereof to the support column 106.

In the example shown, the torque tube interface 109 comprises a bearing assembly 111, which includes a bearing housing 104 that retains a rotating bearing 118, which in turn rotationally engages the torque tube 102 to facilitate tracking the location of the sun with a PV panel 110 such that the PV panel 110 may be generally oriented towards the sun or normal to the east-west portion of the irradiance of the sun. The alignment brackets 108 can be used to secure the bearing housing 104 to the support column 106. In this way, the alignment brackets 108 facilitate the connection of the torque tube 102 to the support column 106 via the bearing assembly 111. While embodiments of the solar tracking system 100 are described with respect to the alignment brackets 108 coupling the torque tube interface 109 to the support column 106 to facilitate tracking of the sun with the PV panel 110, it will be appreciated that different structural types can be coupled to the support column 106 by the alignment brackets 108 to facilitate orientation of the PV panel 110. For example, one or more alignment brackets may couple an arm assembly that includes the structural arm that retains the structural bearing or the structural bushing that are rotationally coupled to a mounting rail coupled to the PV panel 110. The structural bearing or the structural bushing may rotationally couple to the mounting rail to facilitate movement of the PV panel 110 to track the location of the sun.

The example alignment brackets 108 includes surfaces that interface with the bearing housing 104 and the support column 106. For example, the alignment brackets 108 each include a first surface (such as those denoted at 227 in FIGS. 2A-2C, 3A, 3C, and 3D) that interface with the bearing housing 104. The alignment brackets 108 each include a second surface (such as those denoted at 230 in FIGS. 2A, 2C, and 3A-3D) that interface with surfaces 128 of the support column 106. These surfaces 227 and 230 of the alignment brackets 108 may interface with the bearing housing 104 or the surfaces 128 of the support column 106 to position the alignment brackets 108 relative to the support column 106 or to position the bearing housing 104 relative to the alignment brackets 108 and the support column 106 during installation.

The alignment brackets 108 and the support column 106 may include openings (such as those denoted at 241 and 234 in FIGS. 2B and 3A) configured to receive fasteners (such as those denoted at 232 in FIG. 2C) to couple the alignment brackets 108 to the support column 106. In addition, the alignment brackets 108 and the bearing housing 104 may include openings 136 configured to receive fasteners (such as those denoted at 281 in FIG. 2C) to couple the bearing housing 104 to the alignment brackets 108. In this way, the alignment brackets 108 facilitate the connection of the torque tube 102 (via the torque tube interface 109) to the support column 106.

With reference to FIGS. 1 and 2A-2C, it is shown how in one example the alignment brackets 108 each include an attachment member 122. While the alignment brackets 108 each include only a single attachment member 122, in other embodiments, the alignment brackets 108 may include a plurality of attachment members. In the example shown, the attachment members 122 are configured to engage with the support column 106 by physically contacting ends 224 of the support column 106 in such a manner that the alignment brackets 108 hang from and are supported by the support column 106. In this way, the attachment members 122 maintain the position of the alignment brackets 108 relative to the support column 106. The attachment members 122 may facilitate the alignment of the alignment brackets 108 relative to the support column 106 without an installer, an additional installer, or both needing to physically hold the alignment brackets 108 while installing any type of fastener(s) to couple the alignment brackets 108 to the support column 106 and/or the solar components to the support column 106.

Figure 2A:
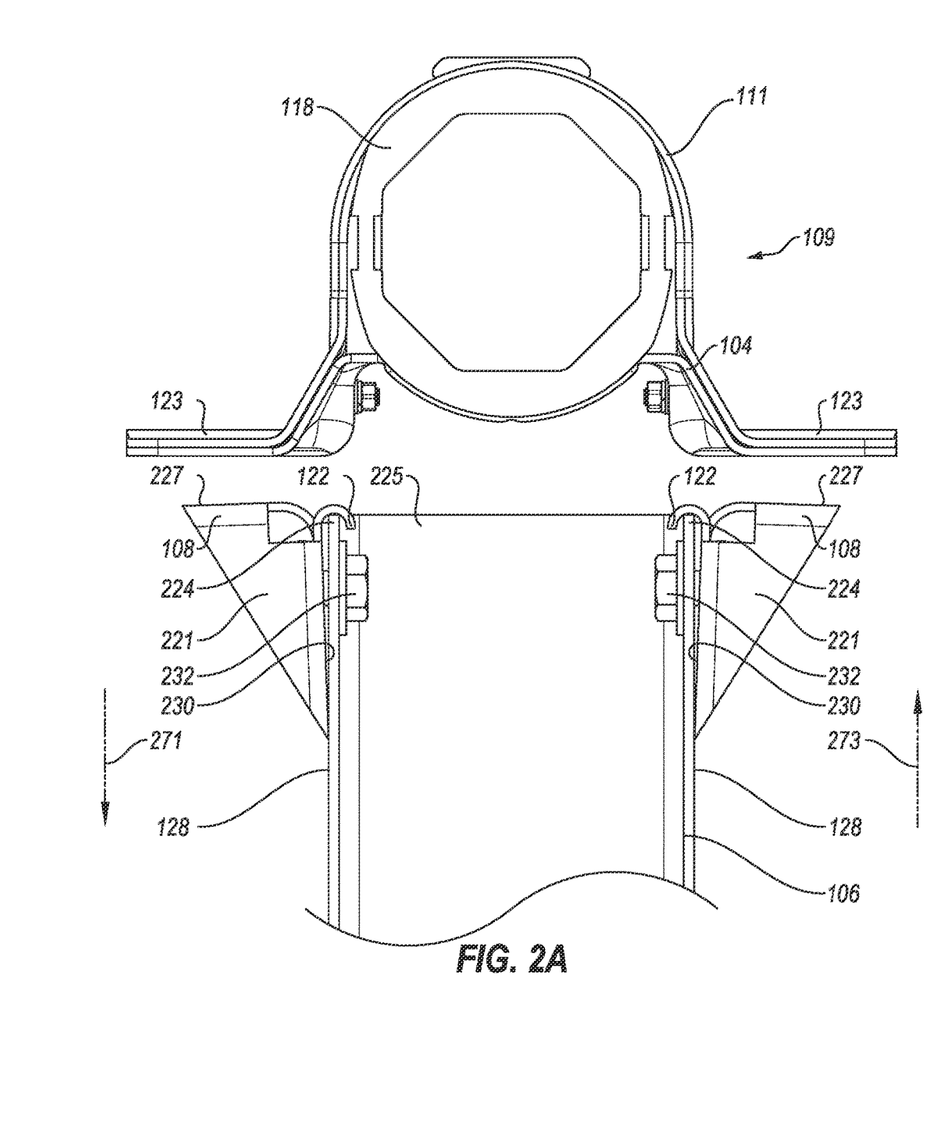
FIG. 2A illustrates a side view of the example torque tube interface of FIG. 1, including the example alignment bracket in an example installation state.
Figure 2B:
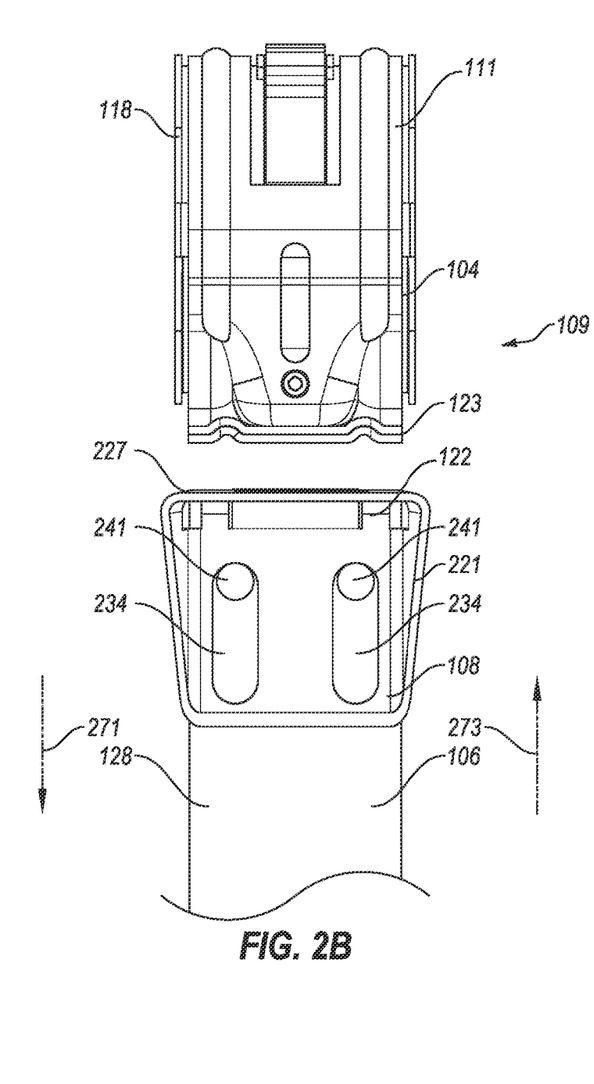
FIG. 2B illustrates a front view of the example torque tube interface, including the example alignment bracket in the example installation state.
Figure 2C:
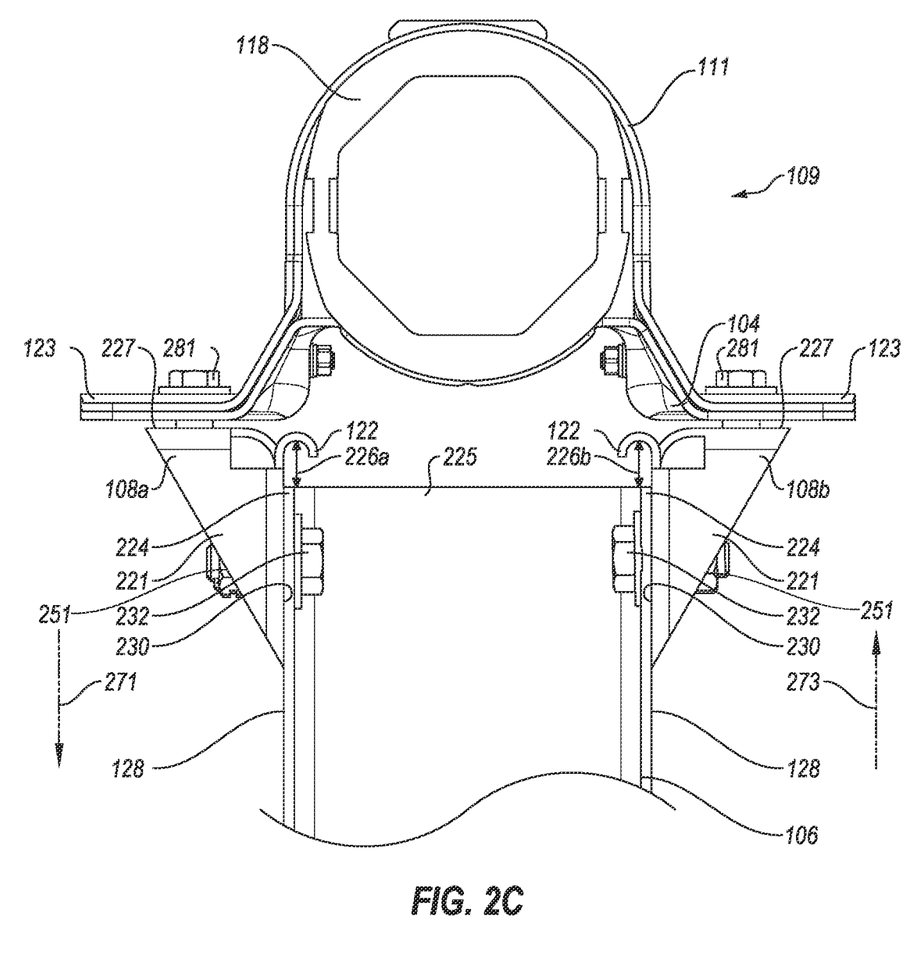
FIG. 2C illustrates a side view of the example torque tube interface, including the example alignment bracket in an example installed state.

In the illustrated embodiment, the attachment members 122 are shown as tabs. However, it will be appreciated that the attachment members 122 may include other physical configurations such as hook tabs, or any other appropriate configuration or shape to engage with the support column 106. In addition, in the illustrated embodiment, the attachment members 122 are shown as being connected to bodies 221 of the alignment bracket 108. However, it will be appreciated that the attachment members 122 may be separate components that are either permanently or temporarily coupled to the bodies 221.

As can be seen in FIGS. 2A and 2B, each alignment bracket 108 includes the attachment member 122 that engages with the ends 224 of the support column 106 to facilitate the position of the alignment brackets 108 relative to the support column 106, thereby eliminating the need for the installer to hold the alignment brackets 108 to facilitate the position of the alignment brackets 108 while installing the fasteners 232.

In some embodiments, as illustrated in FIGS. 2A and 2B, the example installation state may include the alignment brackets 108 physically engaging the ends 224. In these and other embodiments, as illustrated in FIG. 2C, the installed state may include portions of the alignment brackets 108, such as the attachment members 122, being positioned distances 226*a-b* from the ends 224. In the illustrated embodiment, the attachment members 122 are shown as physically engaging the ends 224. However, it will be appreciated that the attachment members 122 may physically engage with any part of the support column 106 including openings of the support column 106 (such as those denoted at 241 in FIG. 2B), sides of the support column 106, or a feature extending away from the surfaces 128 of the support column 106.

In the installation state, the attachment members 122 facilitate the position and/or the alignment of the alignment brackets 108 relative to the surfaces 128 of the support column 106. For example, as illustrated in FIG. 2A, the attachment members 122 may facilitate the position and/or the alignment of the alignment brackets 108 relative to the surfaces 128 of the support column 106 such that the second surfaces 230 of the bodies 221 physically interface with the surfaces 128 of the support column 106. In addition, the bodies 221 may include one or more openings 234 (examples of which are illustrated in FIG. 2B) and the surfaces 128 of the support column 106 may include one or more corresponding openings 241 (examples of which are illustrated in FIG. 2B). In the installation state, the attachment members 122 may facilitate the position and/or the alignment of the sections 108a-b of the alignment bracket 108 relative to the surfaces 128 of the support column 106 such that the openings 234 of the bodies 221 are positioned proximate the corresponding openings 241 of the support column 106. The openings 234 of the bodies 221 are described in more detail below in relation to FIGS. 3A-3D.

As shown in FIG. 2A, the attachment members 122 may engage with the ends 224 of the support column 106 such that the alignment brackets 108 hang from and are supported by the support column 106. In addition, in the installation state, the attachment members 122 may prevent the alignment bracket 108 from moving in a direction of gravity, represented by arrow 271 (e.g., during installation of the alignment brackets 108). For example, as illustrated in FIG. 2A, the attachment members 122 are engaged with the ends 224 of the support column 106 and prevent the alignment brackets 108 from moving in the direction of gravity 271.

The openings 234 of the bodies 221 and the openings 241 of the support column 106 may be configured to receive the fasteners 232. During installation, the fasteners 232 may operably interface with nuts 251 or other retention devices (illustrated in FIG. 2C) to prevent the fasteners 232 from falling relative to the alignment brackets 108 and the support column 106 while still allowing some movement in a vertical direction as defined by the fasteners 232 in the openings 234 of the bodies 221. The fasteners 232 may also operably interface with the nuts 251 or other retention devices to generally facilitate the alignment of the alignment brackets 108 relative to the surfaces 128 of the support column 106.

The alignment brackets 108 may include first surfaces 227 that include the openings 136 and the mounting flanges 123 may include corresponding openings 191 (examples of which are shown in FIG. 1). During installation, the mounting flanges 123 may be aligned relative to the first surfaces 227 of the alignment brackets 108 such that the openings 136 of the first surfaces 227 are positioned proximate the openings 191 of the mounting flanges 123. The openings 136 of the first surfaces 227 are described in more detail below in relation to FIGS. 3A-3D. While described as openings, it will be appreciated that an alternative feature may be used, such as a post, a bolt, a screw, a slot, or a fastener formed in the alignment brackets 108 that interfaces with the bearing housing 104.

The openings 136 of the first surfaces 227 and the corresponding openings 191 of the mounting flanges 123 may be configured to receive the fasteners 281. During installation, the fasteners 281 may operably interface with nuts or other retention devices (not illustrated) to prevent the fasteners 281 from falling relative to the alignment brackets 108 and the mounting flanges 123. The fasteners 281 may also operably interface with the nuts or other retention devices to generally facilitate the alignment of the mounting flanges 123 relative to the first surfaces 227.

The attachment members 122 may permit manual movement of the alignment brackets 108 in a direction opposite of gravity, represented by arrow 273, to permit the alignment brackets 108 to transition from the installation state to the installed state. The attachment members 122 may permit manual movement of the alignment brackets 108 in the direction opposite of gravity 273 to create distances between the attachment members 122 and corresponding parts of the support column 106. For example, the attachment member 122 of the alignment bracket 108 shown on the left in FIG. 2C may permit manual movement of the alignment bracket 108 in the direction opposite of gravity 273 to create a first distance 226a between the corresponding end 224 of the support column 106 and the corresponding attachment member 122. As another example, the attachment member 122 of the alignment bracket 108 shown on the right in FIG. 2C may permit manual movement of the alignment bracket 108 in the direction opposite of gravity 273 to create a second distance 226b between the corresponding end 224 of the support column 106 and the corresponding attachment member 122. In some embodiments, the distances 226a-b may be equal to distances between an engagement surface (such as denoted 342 in FIGS. 3A, 3B, and 3D) of the corresponding attachment members 122 and the corresponding ends 224 of the support column 106. In these and other embodiments, the first distance 226a may be equal to the second distance 226b. Alternatively, the first distance 226a may be different than the second distance 226b.

During installation, the alignment brackets 108 may be moved from positions corresponding to the installation state (e.g., example positions illustrated in FIGS. 2A and 2B) to positions corresponding to the installed state (e.g., example positions illustrated in FIG. 2C). The alignment brackets 108 may be positioned to cause the bearing housing 104 and the rotating bearing 118 to be positioned such that the torque tube 102 (not illustrated in FIGS. 2A-2C) extends along an axis so as to avoid dips, bends, or other irregularities along a length of the torque tube 102 in the installed state. It will be appreciated that the installed state might have various other configurations than what is illustrated in FIG. 2C. In another example installed state, one or more of the alignment brackets 108 may physically engage with the ends 224 and one or more of the distances 226a-b may be equal to zero millimeters.

When in the positions corresponding to the installed state, the fasteners 232 may operably interface with the nuts 251 to draw the alignment brackets 108 towards the support column 106 to apply a compressive force on the alignment brackets 108 and the support column 106. For example, the fasteners 232 may operably interface with the nuts 251 to draw the second surfaces 230 of the bodies 221 towards the surfaces 128 of the support column 106 to apply the compressive force on the alignment brackets 108 and the support column 106. The compressive forces applied by the fasteners 232 and the nuts 251 may cause the alignment brackets 108 to facilitate the positions corresponding to the installed state relative to the support column 106.

Two fasteners 232 are illustrated in FIG. 2C as coupling the alignment brackets 108 to the corresponding surfaces 128 of the support column 106 for example purposes. However, multiple fasteners 232 may couple one or more of the alignment brackets 108 to the corresponding surfaces 128 of the support column 106. For example, additional fasteners may be positioned behind a wall 225 of the support column 106. In this particular example, the fasteners 232 extend through the support column 106 and the bodies 221 into a volume (not illustrated in FIGS. 2A-2C) defined by the bodies 221, but other configurations could be used. For example, the fasteners 232 may extend through the bodies 221 and the support column 106 and the nuts 251 may be positioned proximate the support column 106.

The fasteners 281 may operably interface with the nuts to draw the mounting flanges 123 towards the first surfaces 227 of the alignment brackets 108 to apply a compressive force on the alignment bracket 108 and the mounting flanges 123. The compressive forces applied by the fasteners 281 and the nuts may cause the bearing housing 104 to maintain a position corresponding to the installed state.

In the embodiment illustrated in FIG. 2B, the openings 234 of the alignment brackets 108 are shown as slots and the openings 241 of the support column 106 are shown as circular holes. However, it will be appreciated that the openings 234 of the alignment brackets 108 and the openings 241 of the support column 106 may include any appropriate shapes. For example, the openings 234 of the alignment brackets 108 may include circular holes and the openings 241 of the support column 106 may include slots.

With reference to FIGS. 3A-3D, one example of the alignment brackets of FIGS. 1-2C is shown. As shown in FIGS. 3A-3D, the attachment member 122 includes two attachment tabs 338. However, in other embodiments, the attachment member 122 may include one attachment tab 338 or three or more attachment tabs 338. For example, the attachment member 122 may include one attachment tab 338 positioned at a center of a width of the alignment bracket 108. As another example, the attachment member 122 may include three attachment tabs distributed along the width of the alignment bracket 108. As yet another example, the attachment member 122 may include one attachment tab 338 extending along the width of the alignment bracket 108.

As shown in FIGS. 3A-3D, the attachment tabs 338 are positioned on a second end 340 of the body 221. However, in other embodiments, the attachment tabs 338 may be positioned anywhere between or on the second end 340 and a first end 341 of the body 221. The attachment tabs 338 may be positioned along a height (e.g., between the second end 340 and the first end 341 of the body 221) to cause a height of the first surface 227 to be equal to or above the ends 224. For example, as illustrated in FIGS. 2A and 3A-3D, the attachment tabs 338 are positioned at the second end 340 of the body 221 to cause the first surface 227 to be equal to or above the ends 224.

The attachment tabs 338 may include engagement surfaces 342. The engagement surfaces 342 may be configured to physically engage with the ends 224 of the support column 106. The engagement surfaces 342 may physically engage with the ends 224 of the support column 106 to prevent movement of the alignment bracket 108 in the direction of gravity (e.g., in the direction of arrow 271 shown in FIGS. 2A-2C).

In some embodiments, the attachment tabs 338 may include a cross-sectional shape configured to mate with the corresponding part of the support column 106 (e.g., the ends 224). For example, the attachment tabs 338 may include a semi-rectangular cross-sectional shape to mate with a boxed shape of the ends 224 of the support column 106. As another example, and as shown in FIGS. 3A-3D, the attachment tabs 338 may include a semi-circular cross-sectional shape to mate with a rounded shape of the ends 224 of the support column 106. In these and other embodiments, the attachment tabs 338 may include a cross-sectional shape configured to mate with multiple different shapes of the ends 224 of the support column 106. The attachment tabs 338 may include a rounded cross-sectional shape, a semi-circular cross-sectional shape, a U cross-sectional shape, a semi-rectangular cross-sectional shape, a rounded semi-rectangular cross-sectional shape, a semi-square cross-sectional shape, a triangular cross-sectional shape, or some combination thereof.

Figure 3A:
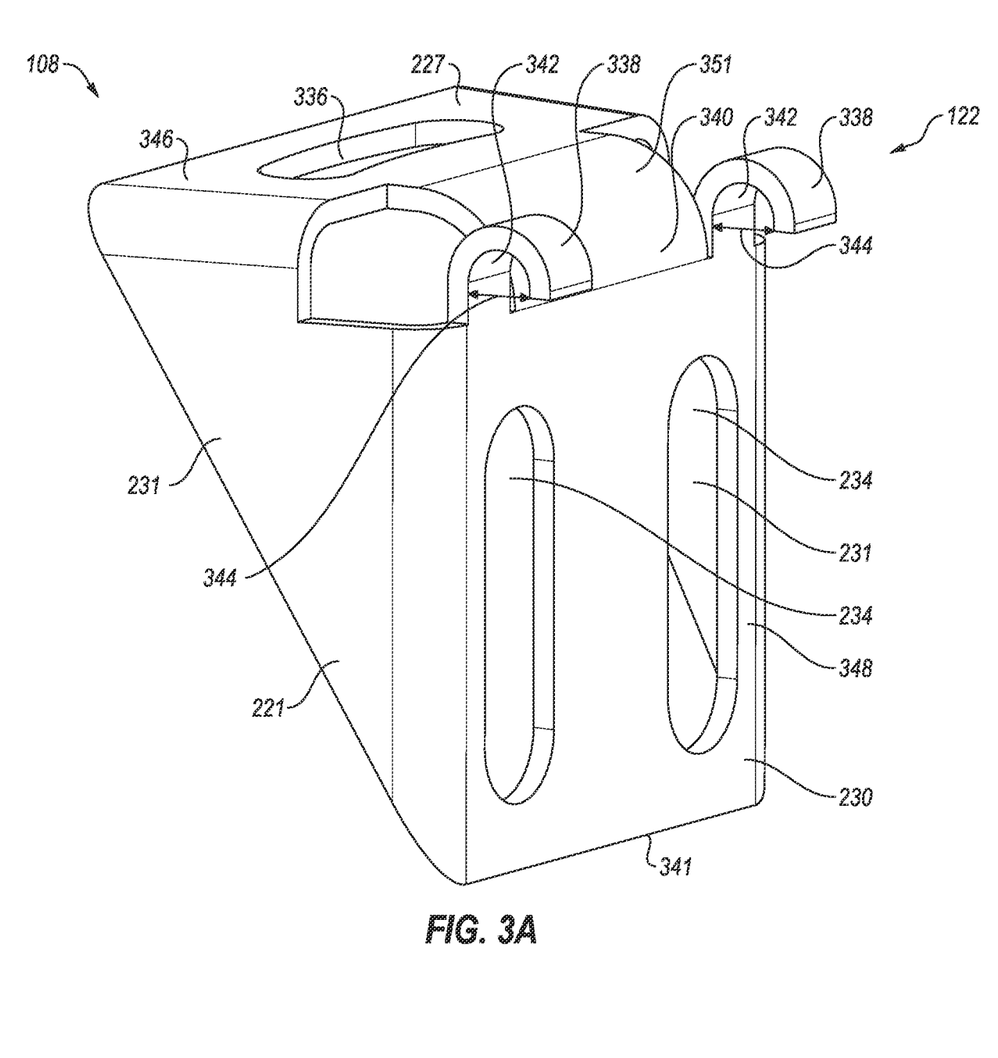
FIGS. 3A-3D illustrate a perspective view, a bottom view, a top view, and a side view, respectively, of one example section that corresponds to sections of the alignment bracket of FIG. 1.
Figure 3B:
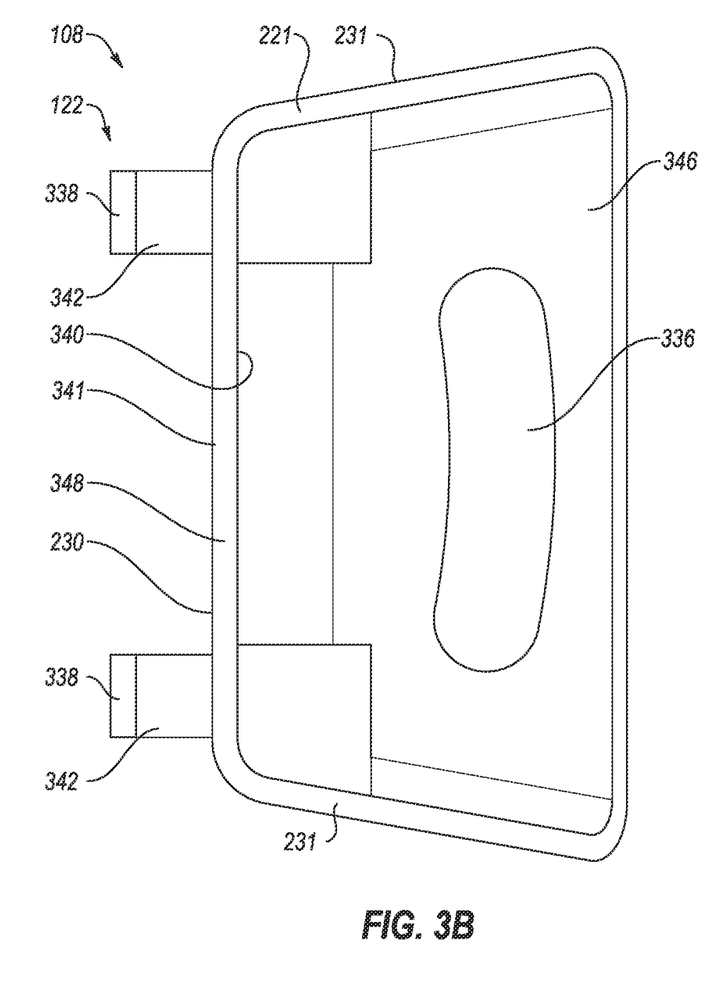
Figure 3C:
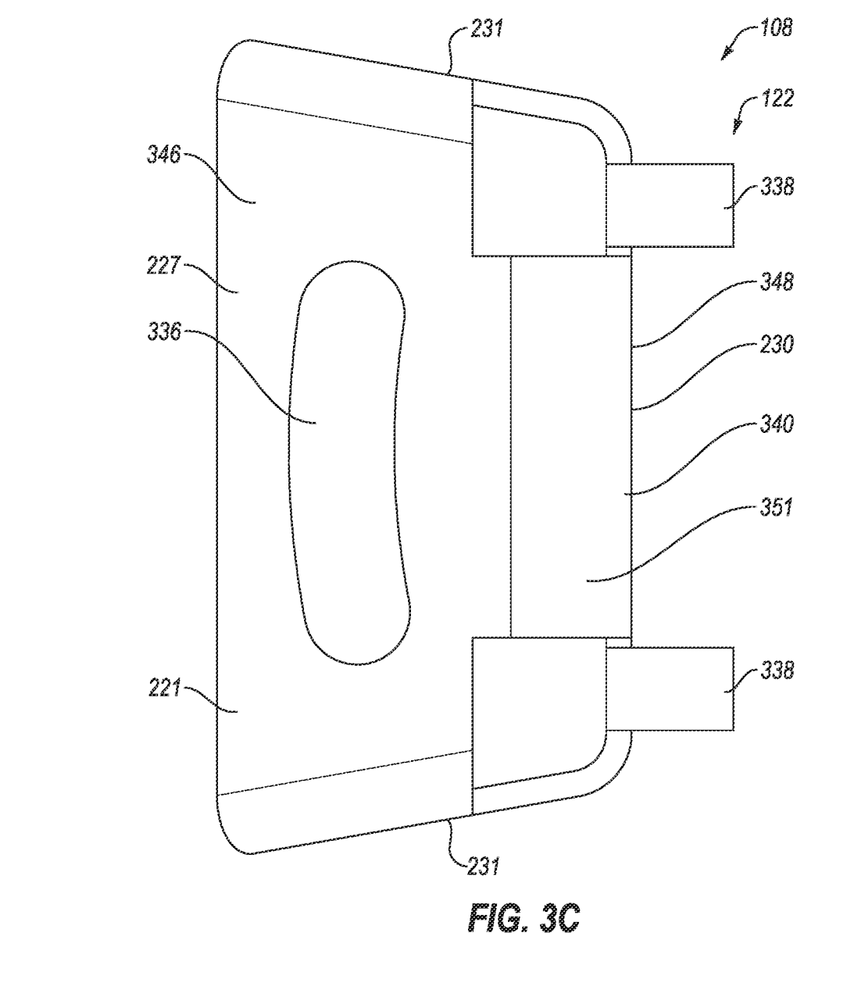
Figure 3D:
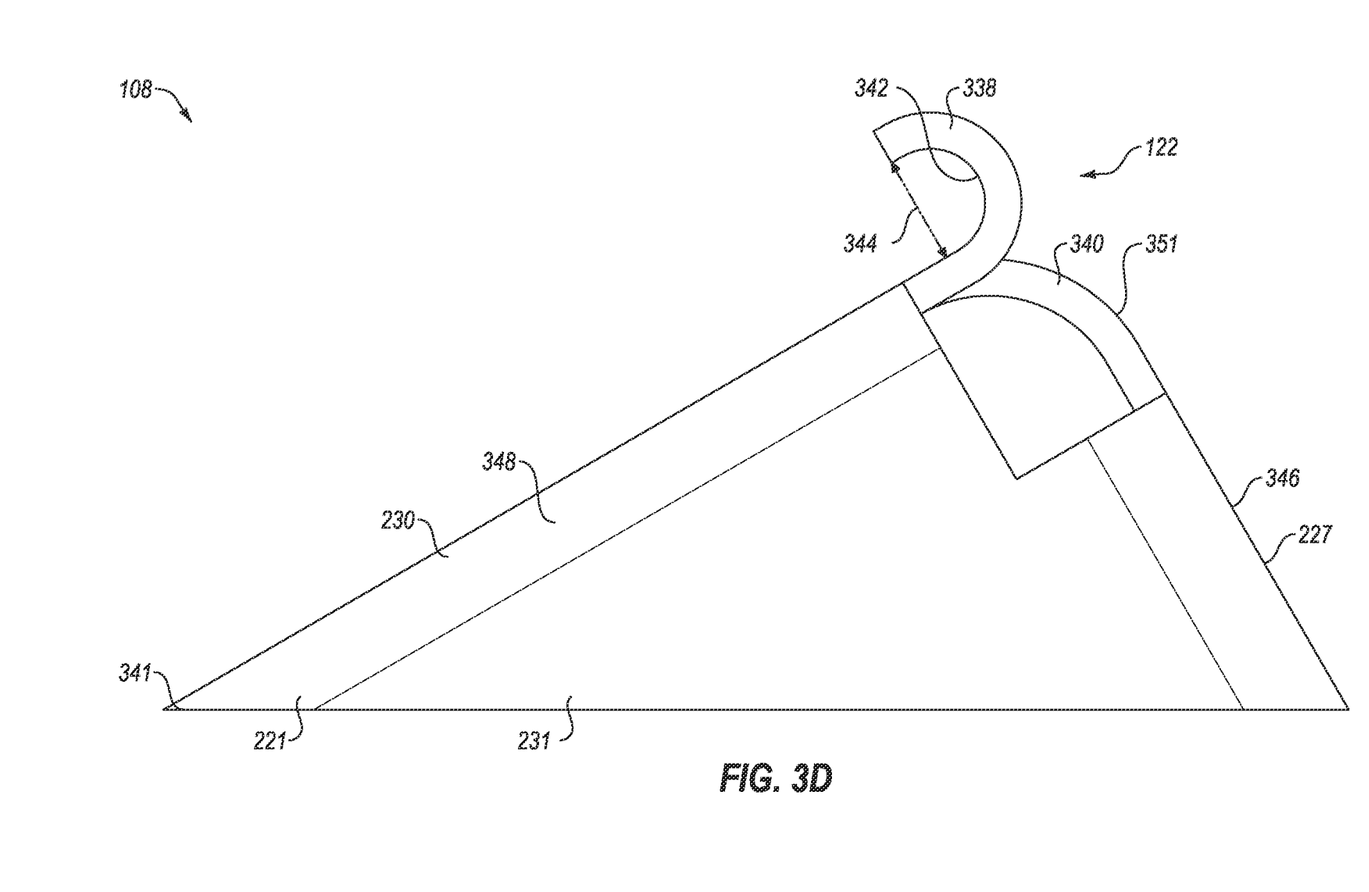

The engagement surfaces 342 may include openings 344 (illustrated in FIGS. 3A and 3D). As discussed above, the attachment member 122 may be configured to engage with the corresponding parts of the support column 106 (e.g., the ends 224). In one example, the openings 344 may be configured to receive the ends 224 of the support column 106 to permit the attachment member 122 to engage with the ends 224. In some embodiments, the openings 344 of the engagement surfaces 342 may be sized based on a predefined thickness of the support column 106. In these and other embodiments, the openings 344 of the engagement surfaces 342 may be sized to receive the corresponding parts of the support column 106 of different thicknesses.

The attachment tabs 338 may be positioned at different positions along the width of the alignment bracket 108 to accommodate the support column 106 including different widths or different configurations. For example, the attachment tabs 338, as illustrated in FIGS. 3A-3D, may be positioned at ends of the second end 340 to accommodate the support column 106 including wider widths. As another example, the attachment tabs 338 may be positioned closer to or at a center of the second end 340 to accommodate the support column 106 including narrower or wider widths. Additionally or alternatively, the attachment tabs 338 may be positioned closer to or at the center of the second end 340 to accommodate a web of the support column 106 that is not centered relative to flanges of the support column 106.

In some embodiments, the body 221 and the attachment member 122, including the attachment tabs 338, may include a unibody piece of material. In other embodiments, the body 221 and the attachment member 122, including the attachment tabs 338, may include multiple pieces of material that are coupled to each other. The body 221 and the attachment member 122 may include a metallic material, a plastic material, a rubber material, a ceramic material, or any other appropriate material. In some embodiments, the metallic material may include an aluminum material, a steel material, a galvanized steel material, a pre-galvanized steel material, a zinc coated steel material, an aluminum coated steel material, a magnesium coated steel material, or some combination thereof. In some embodiments, the body 221 and the attachment member 122, including the attachment tabs 338, may include different pieces of material. For example, the body 221 may include the aluminum material and the attachment member 122 may include the steel material. In some embodiments, the attachment member 122 may include a single horizontal part (not illustrated) that extends away from the body 221 and the attachment tabs 338 may extend away from the single horizontal part.

The body 221 may include a first portion 348 and a second portion 346. In some embodiments, the first portion 348 and the second portion 346 may be connected to each other at the second end 340 via a bridge 351 of material. Alternatively or additionally, the first portion 348 and the second portion 346 may be coupled to each other via sidewalls 231 of the body 221. The second portion 346, as illustrated in FIGS. 3A-3C, may include an opening 336. In some embodiments, the opening 336 may be configured as a slot to permit movement of a fastener within the opening 336 when partially fastened. In some embodiments, the second portion 346 may include two or more openings. The first portion 348, as illustrated in FIG. 3A, includes the openings 234 configured to receive the fasteners 232 to couple the alignment bracket 108 to the support column 106 as discussed above in relation to FIGS. 2A-2C. In some embodiments, the openings 234 may be configured as slots to permit movement of the fasteners 232 within the openings 234 when partially fastened. In some embodiments, the first portion 348 may include one opening or three or more openings.

Figure 4A:
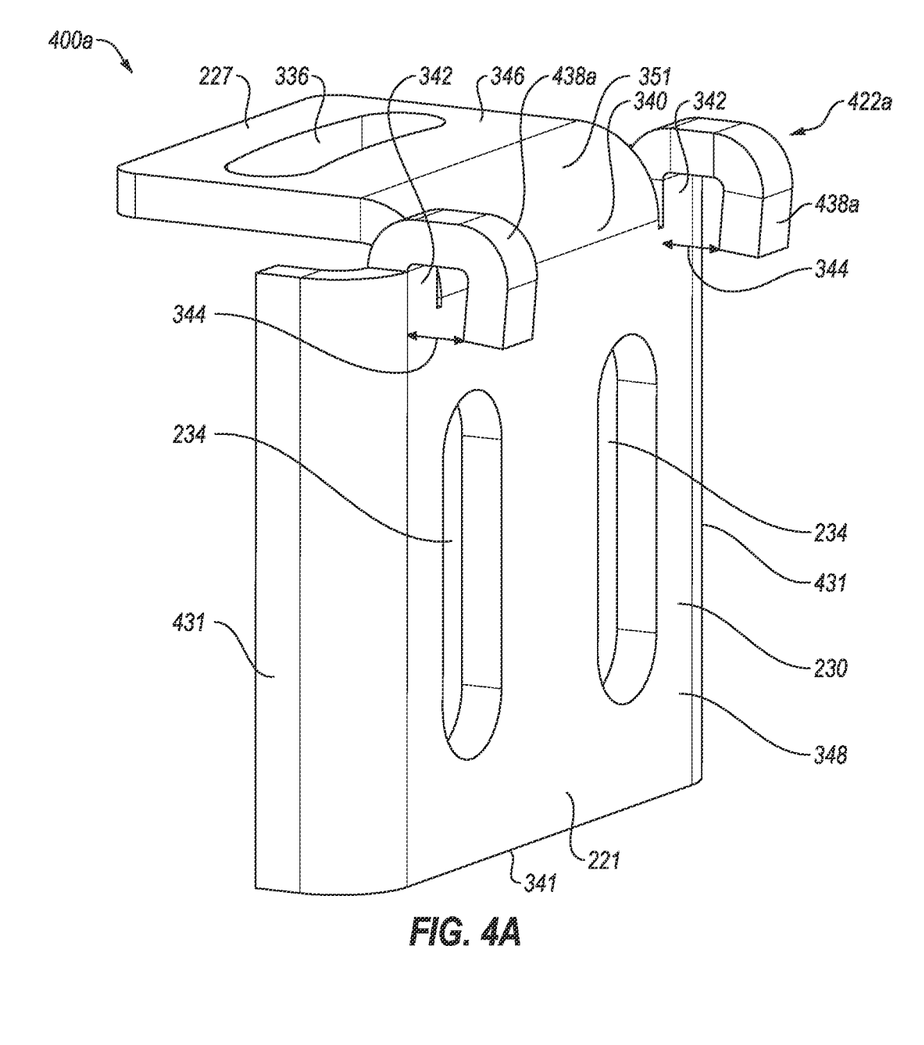
FIGS. 4A and 4B illustrate perspective views of other example sections of alignment brackets.

FIG. 4A illustrates a perspective view of another example alignment bracket 400a. The example alignment bracket 400a may include a profile designed for different loads than the alignment brackets 108 illustrated in FIGS. 1-3C. For example, the first portion 348 may not be connected to the second portion 346 via sidewalls 431. However, the second portion 346 may be connected to the first portion 348 via the bridge 351 of material. In these and other embodiments, the sidewalls 431 may be flanges that extend away from the first portion 348 without being coupled to the second portion 346 on one or both sides of the alignment bracket 400a. As illustrated in FIG. 4A, an attachment member 422a of the alignment bracket 400a includes attachment tabs 438a with a U cross-sectional shape or a semi-rectangular or curved semi-rectangular cross-sectional shape. It will be appreciated that the attachment tabs 438a of may have various other configurations than what is illustrated in FIG. 4A. For example, the attachment tabs 438a may include a rounded cross-sectional shape, a semi-circular cross-sectional shape, a U cross-sectional shape, a semi-rectangular cross-sectional shape, a semi-square cross-sectional shape, or some combination thereof.

Figure 4B:
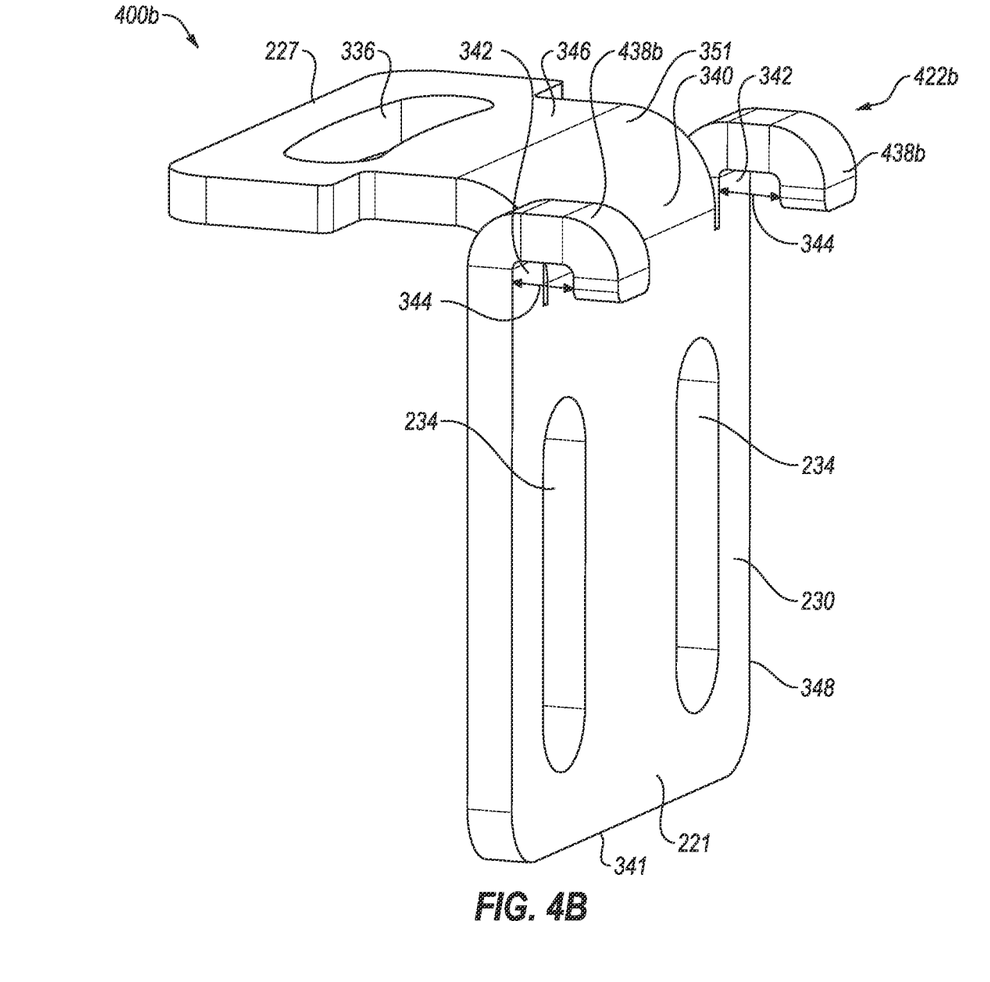

FIG. 4B illustrates a perspective view of yet another example alignment bracket 400b. The example alignment bracket 400b may include a profile designed for different loads than the alignment brackets 108 illustrated in FIGS. 1-3C and the alignment bracket 400a illustrated in FIG. 4A. For example, the sidewalls 231 and 431 are omitted. However, the second portion 346 may be coupled to the first portion 348 via the bridge 351 of material. In these and other embodiments, as illustrated in FIG. 4B, an attachment member 422b of the alignment bracket 400b includes attachment tabs 438b with a semi-square cross-sectional shape. It will be appreciated that the attachment tabs 438b may have various other configurations than what is illustrated in FIG. 4B. For example, the attachment tabs 438b may include a rounded cross-sectional shape, a semi-circular cross-sectional shape, a U cross-sectional shape, a semi-rectangular cross-sectional shape, a semi-square cross-sectional shape, or some combination thereof.

Figure 5A:
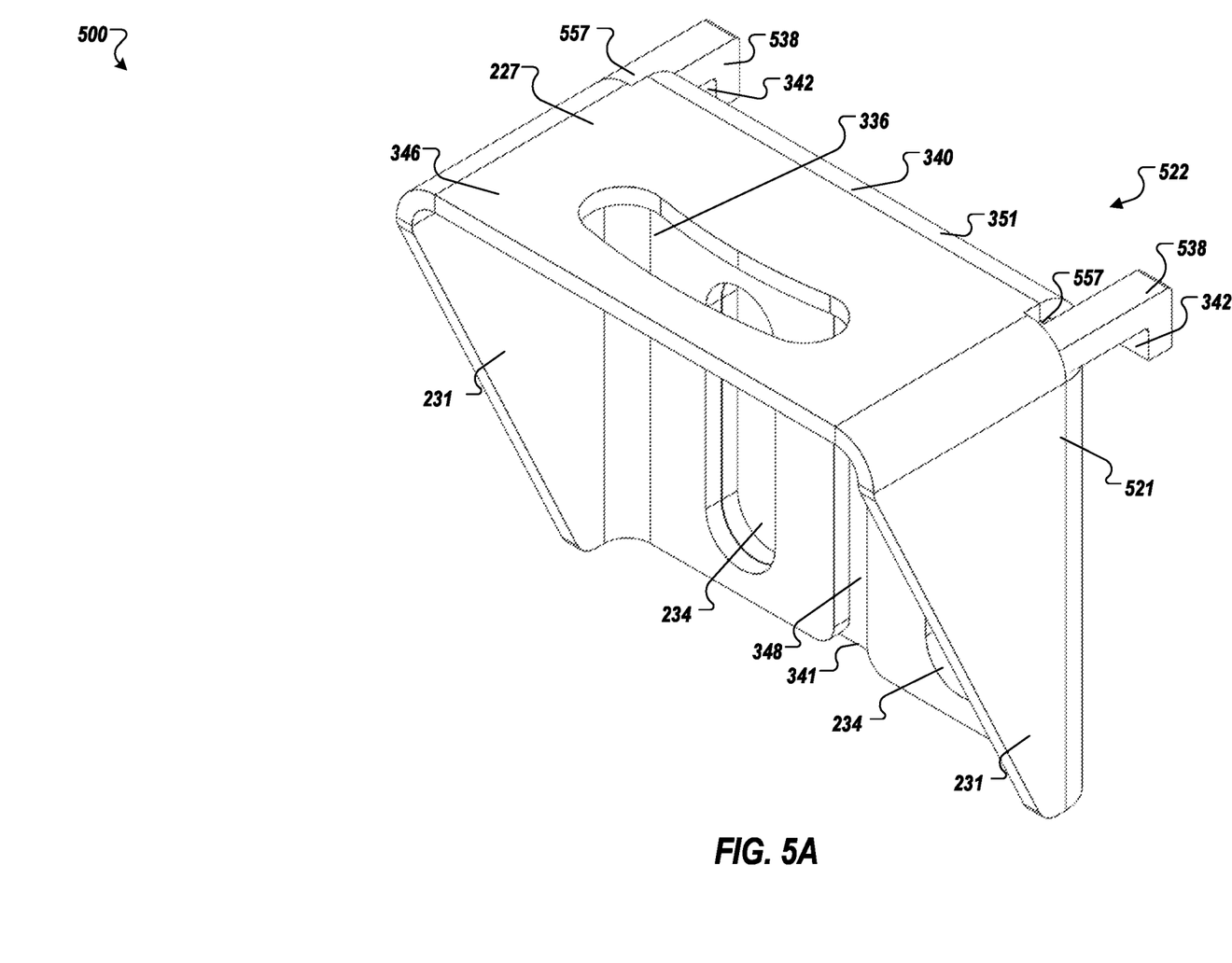
FIGS. 5A and 5B illustrate a perspective view and an exploded view, respectively, of an example section of an alignment bracket that includes an independent attachment member and an independent body;
all according to at least one embodiment described in the present disclosure.
Figure 5B:
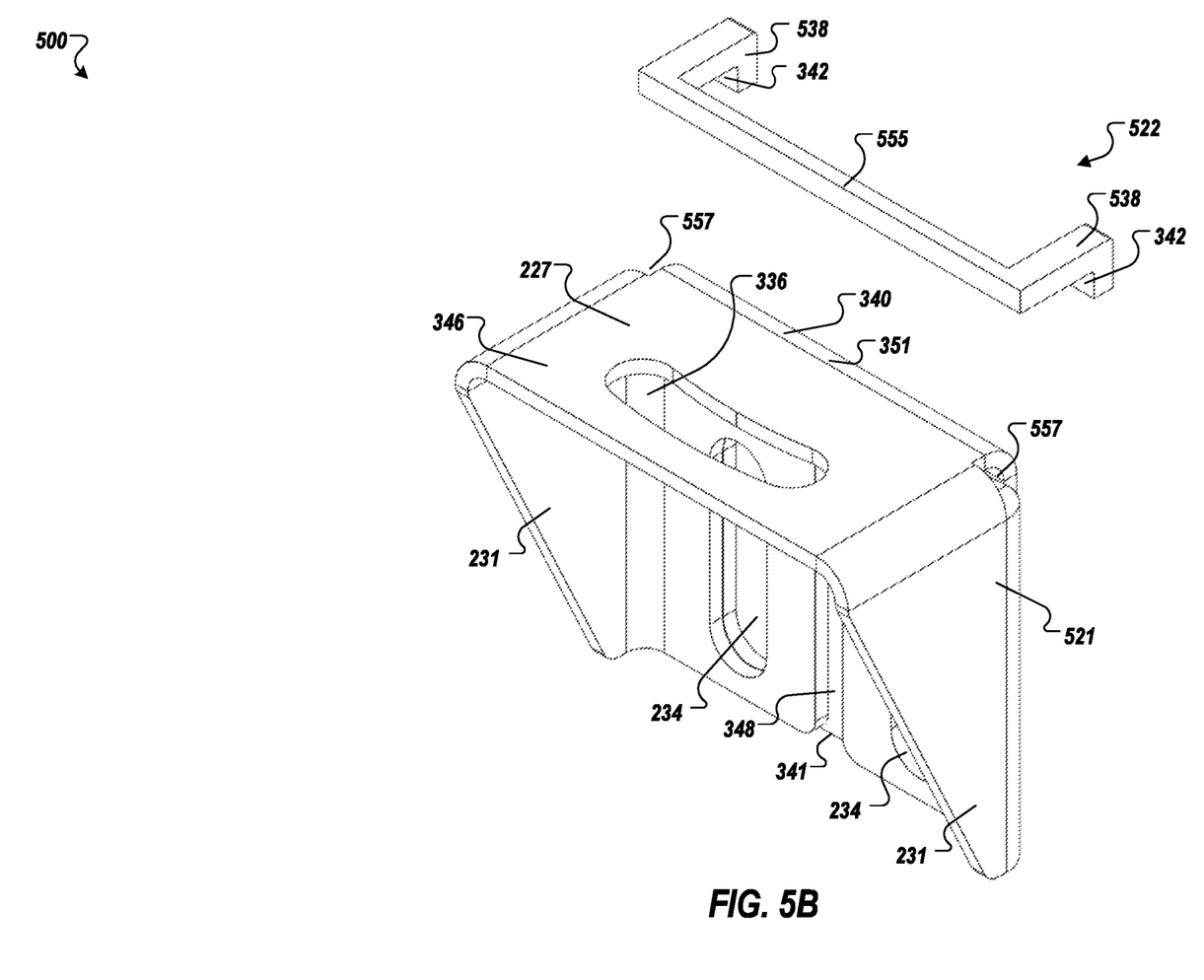

FIGS. 5A and 5B illustrate a perspective view and an exploded perspective view, respectively, of an example alignment bracket 500. The example alignment bracket 500, as illustrated in FIGS. 5A and 5B, includes an independent attachment member 522 and an independent body 521. The example alignment bracket 500 may be comparable to the alignment brackets 108 of FIGS. 1-3D, but the independent attachment member 522 and the independent body 521 are separate components. During manufacturing or operation, the independent attachment member 522 may be permanently or temporarily coupled to the independent body 521.

The independent attachment member 522, as shown in FIGS. 5A and 5B, may include attachment tabs 538 that are coupled to an attachment body 555 (shown in FIG. 5B). The alignment bracket 500 may include corner openings 557 that are configured to receive the attachment tabs 538 such that the attachment body 555 is proximate the bridge 351 of material and the attachment tabs 538 extend away from the independent body 521.

In some embodiments, as illustrated in FIGS. 5A and 5B, the attachment tabs 538 may include an L cross-sectional shape. It will be appreciated that the attachment tabs 538 of the independent attachment member 522 may have various other configurations than what is illustrated in FIGS. 5A and 5B. For example, the attachment tabs 538 may include a rounded cross-sectional shape, a semi-square cross-sectional shape, a semi-circular cross-sectional shape, a U cross-sectional shape, a semi-rectangular cross-sectional shape, a semi-square cross-sectional shape, or some combination thereof.

Disclosed embodiments include alignment brackets 108, 400a-b, or 500 that include attachment members 122 or 522 that assist with the installation process. For example, the attachment members 122 or 522 facilitate the position and/or the alignment of the alignment brackets 108, 400a-b, or 500 relative to the support column 106 prior to the fasteners 232 coupling the alignment brackets 108, 400a-b, or 500 to the support column 106. The attachment members 122 or 522 obviate the need for an installer (or an assistant) to facilitate the position and/or the alignment of the alignment brackets 108, 400a-b, or 500 relative to the support column 106 while installing the fasteners 232. The attachment members 122 or 522 increase installation efficiency, reduce manpower requirements, and thereby reduce costs associated with the installation process.

Terms used in the present disclosure and especially in the appended claims (e.g., bodies of the appended claims) are generally intended as "open terms" (e.g., the term "including" should be interpreted as "including, but not limited to.").

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An alignment bracket suitable for facilitating the connection of solar components in a photovoltaic (PV) system, the alignment bracket comprising:
   a first surface configured to physically interface with a corresponding surface of a solar component of the PV system, the first surface having a proximal end, a distal end, a first lateral edge that connects the proximal and distal ends on a first side of the first surface, and a second lateral edge that connects the proximal and distal ends on a second side of the first surface;
   a second surface configured to physically interface with a corresponding surface of a support column, the second surface having a proximal end, a distal end, a first lateral edge that connects the proximal and distal ends on a first side of the second surface, and a second lateral edge that connects the proximal and distal ends on a second side of the second surface, wherein at least portions of the proximal ends of the first and second surfaces are connected such that the first and second surfaces are approximately orthogonal to each other; and an attachment member integrally formed with at least one of the first surface and the second surface, the attachment member comprising an engagement surface that extends in a direction that is generally opposite a direction in which the first surface extends, the engagement surface configured to engage with a top surface of the support column to facilitate a position of the second surface relative to the corresponding surface of the support column.

2. The alignment bracket of claim 1, wherein the engagement surface is configured to engage with the top surface of the support column such that the alignment bracket hangs from and is supported by the support column.

3. The alignment bracket of claim 1, wherein the engagement surface is configured to engage with the top surface of the support column to permit movement of the alignment bracket relative to the support column.

4. The alignment bracket of claim 1, wherein:
the second surface includes a first opening;
the engagement surface is configured to engage with the top surface of the support column to facilitate the position of the second surface relative to the corresponding surface of the support column such that the first opening is positioned proximate a second corresponding opening of the support column; and
the first opening and the second corresponding opening are sized to receive a fastener to couple the alignment bracket to the support column.

5. The alignment bracket of claim 4, wherein the first opening includes a slot.

6. The alignment bracket of claim 1, further comprising a second attachment member integrally formed with the at least one of the first surface and the second surface, the second attachment member comprising a second engagement surface that extends in the direction that is generally opposite the direction in which the first surface extends, the engagement surface configured to engage with the top surface of the support column to facilitate a position of the second surface relative to the corresponding surface of the support column.

7. The alignment bracket of claim 1, wherein the engagement surface includes an attachment opening, the attachment opening being shaped to receive the top surface of the support column.

8. The alignment bracket of claim 1, wherein the solar component of the PV system comprises at least one of:
a bearing housing;
a torque tube interface;
a drive system;
a rotation lock;
a damper device;
a sensor;
an electronic device;
a structural arm;
a structural bearing; or
a structural bushing.

9. The alignment bracket of claim 1, wherein the first surface, the second surface, and the attachment member comprise a unibody piece of material.

10. The alignment bracket of claim 1, wherein the attachment member:
comprises at least one of a rounded cross-sectional shape, a semi-circular cross-sectional shape, a U cross-sectional shape, a semi-rectangular cross-sectional shape, or a semi-square cross-sectional shape; and
is sized or shaped based on a thickness of the support column.

11. The alignment bracket of claim 1, wherein the alignment bracket is made of at least one of a galvanized steel material, a zinc coated steel material, an aluminum coated steel material, or a magnesium coated steel material.

12. The alignment bracket of claim 1, wherein the first surface further comprises at least one of an opening, a slot, a bolt, a fastener, a screw, or a post to couple the solar component of the PV system to the alignment bracket.

13. An alignment bracket suitable for facilitating the connection of solar components in a photovoltaic (PV) system, the alignment bracket comprising:
a first surface configured to physically interface with a corresponding surface of a solar component of the PV system, the first surface having a proximal end, a distal end, a first lateral edge that connects the proximal and distal ends on a first side of the first surface, and a second lateral edge that connects the proximal and distal ends on a second side of the first surface;
a second surface configured to physically interface with a corresponding surface of a support column, the second surface having a proximal end, a distal end, a first lateral edge that connects the proximal and distal ends on a first side of the second surface, and a second lateral edge that connects the proximal and distal ends on a second side of the second surface, wherein at least portions of the proximal ends of the first and second surfaces are connected such that the first and second surfaces are approximately orthogonal to each other;
a sidewall that connects at least a portion of the first lateral edge of the first surface with at least a portion of the first lateral edge of the second surface; and
an attachment member comprising a hook tab that includes a curved engagement surface configured to engage with a part of the support column to facilitate a position of the second surface relative to the corresponding surface of the support column.

14. The alignment bracket of claim 13, wherein the engagement surface is configured to engage with the part of the support column such that the alignment bracket hangs from and is supported by the support column.

15. The alignment bracket of claim 13, wherein:
the second surface includes a first opening;
the engagement surface is configured to engage with the part of the support column to facilitate the position of the second surface relative to the corresponding surface of the support column such that the first opening is positioned proximate a second corresponding opening of the support column; and
the first opening and the second corresponding opening are sized to receive a fastener to couple the alignment bracket to the support column.

16. The alignment bracket of claim 15, wherein the first opening includes a slot.

17. The alignment bracket of claim 13, further comprising a second hook tab comprising a second engagement surface configured to engage with the part of the support column to facilitate a position of the second surface relative to the corresponding surface of the support column.

18. The alignment bracket of claim 13, wherein the solar component of the PV system comprises at least one of:
a bearing housing;
a torque tube interface;
a drive system;

a rotation lock;
a damper device;
a sensor;
an electronic device;
a structural arm;
a structural bearing; or
a structural bushing.

19. The alignment bracket of claim 13, wherein the first surface, the second surface, the sidewall, and the hook tab comprise a unibody piece of material.

20. The alignment bracket of claim 13, wherein the alignment bracket is made of at least one of a galvanized steel material, a zinc coated steel material, an aluminum coated steel material, or a magnesium coated steel material.

* * * * *